Jan. 11, 1949.  R. H. PRATT ET AL  2,458,637
FLUID FLOW MEASURING DEVICE
Filed April 5, 1946

INVENTORS.
ROBERT H. PRATT.
JAMES Q. UNDERWOOD, JR.
BY
ATTORNEYS

Patented Jan. 11, 1949

2,458,637

UNITED STATES PATENT OFFICE 2,458,637

FLUID FLOW MEASURING DEVICE

Robert H. Pratt and James Q. Underwood, Jr., Narrows, Va., assignors to Celanese Corporation of America, a corporation of Delaware Application April 5, 1946, Serial No. 659,808

6 Claims. (Cl. 73—209)

1

This invention relates to a novel rotameter employed for the measurement of instantaneous rates of fluid flow and relates more particularly to an improved float or bob to be employed in connection with such rotameter measuring devices.

Rotameters employed for measuring the rate of fluid flow consist essentially of a vertically positioned tapered tube, usually formed of a transparent material, the fluid being metered flowing upwardly through the tube. A float or bob which is freely movable up and down in the tube is set therein and the vertical position of the float or bob in the tube buoyed up by the fluid stream is a measure of the instantaneous flow rate of the fluid. A scale on the tube graduated in any desired units of flow is provided, from which the volume of fluid passing through the measuring device may be readily calculated. Rotameters are highly advantageous for measuring the flow rates of clear liquids which are free of solid particles. Where, however, the liquid being measured contains solid particles, the latter end to foul the float or bob and to block the tube of the rotameter, thus rendering it inoperative until the float or bob is cleared and the solid matter is removed. This tendency of rotameters to block up limits their uses.

It is, therefore, an important object of this invention to provide an improved rotameter containing a novel float or bob which does not become blocked or fouled by solid materials present in the liquid being measured.

Another object of this invention is to provide a float or bob for use in rotameters which will be accurate, of simple construction and which will be self-clearing when the liquid being measured contains solid matter.

Other objects of this invention will appear from the following detailed description and accompanying drawing.

In the drawing.

Like reference numerals indicate like parts throughout the several views of the drawing.

Figures 1, 2, 3:
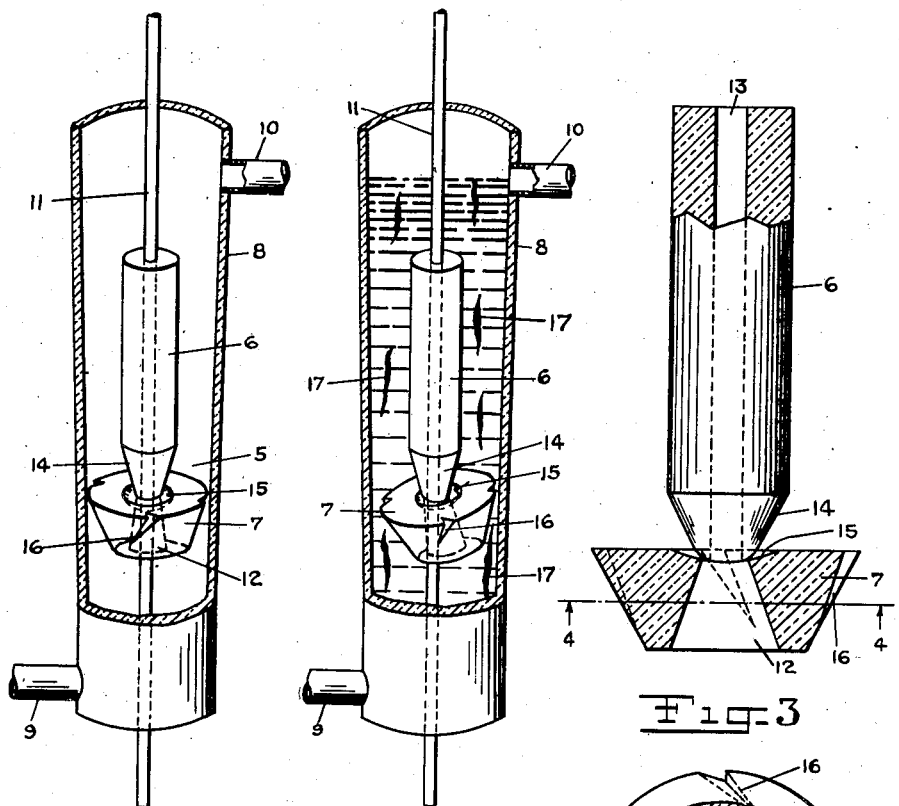
Fig. 1 is a front elevational view, partly in section, of our improved rotameter, showing the novel float or bob of our invention set within the rotameter tube through which the fluid being measured flows in an upward direction.
Fig. 2 is a front elevational view, partly in section, showing our novel rotameter and the self-clearing float or bob in operation measuring the rate of flow of a liquid which contains solid matter.
Fig. 3 is a detail view, partly in section, on an enlarged scale, of our novel self-cleaning float or bob.
Figure 4:
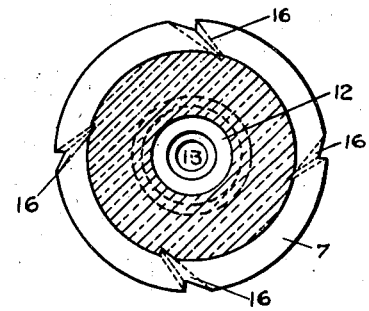
Fig. 4 is a section of the lower portion of said float or bob taken along the line 4—4 of Fig. 3, in the direction of the arrows.

Referring now to the drawing and more particularly to Figs. 1 and 2, the self-clearing float or bob in the rotameter of our invention, generally indicated by reference numeral 5, comprises an upper weighted section 6 and a lower rotor section 7, comprising the inverted frustum of a cone, cooperating therewith. Rotor section 7 is separate from the upper section 6 being merely in surface to surface contact therewith. Float 5 is enclosed in a tube 8 provided with a liquid inlet 9 and an outlet 10 and both sections 6 and 7 thereof ride upwardly or downwardly along a controlled path on a guide rod 11 which passes through an axial hole 13 in upper section 6 and through a hole 12 in rotor section 7. The vertical position of float 5, in cooperation with a scale, not shown, on the surface of the tube 8, indicates the instantaneous rate of flow of any liquid passing upwardly through said tube 8. Weighted section 6 is of a generally cylindrical shape, the lower end thereof being conically shaped, however, to form a tapered portion 14. The extreme lower section of tapered portion 14 is rounded so that the surface thereof forms a segment of a sphere.

The diameter of the centrally located hole 12 in the rotor section 7 of float 5 gradually increases in a downward direction. A dished or concave portion 15 is provided in the center of the upper surface of rotor section 7 so that in combination with the tapered and rounded portion 14 of upper weighted section 6, a modified ball and socket joint is formed. Inclined notches 16 are provided in the sides of rotor section 7 to promote the spinning thereof when the liquid being metered is flowing upwardly through tube 8.

When metering clear liquids which do not contain any solid material suspended therein, the self-cleaning float or bob 5 remains suspended in the fluid stream, as shown in Fig. 1, and sections 6 and 7 merely move in an upward or downward direction on guide rod 11, depending upon the changes in the rate of flow of the liquid passing through tube 8. When, however, the liquid being metered contains solid particles such as, for example, those indicated in Fig. 2, by reference numeral 17, the rotor section 7 spins in the normal manner but accommodates itself to the changing character of the liquid. The pressure of the solid particles intermittently impinging against the tapered side walls of said rotor section 7 causes the latter to tilt momentarily. This tilting action allows said particles to slide by rotor 7 and to pass upward with the liquid stream. After said particles have been cleared due to the tilting action of the rotor section 7, the latter reverts to its normal horizontal running position and the float or bob 5 continues to indicate the rate of flow of the liquid passing through the tube 8 by the height at which it is sustained by the force of the moving liquid. In lieu of rotor 7 having a shape comprising the inverted frustum of a cone, it may comprise any suitable shape, but having the depression on its upper surface and the slotted sides of the rotor shown and described herein.

It is to be understood that the foregoing detailed description is given merely by way of illustration and that many variations may be made therein without departing from the spirit of our invention.

Having described our invention, what we desire to secure by Letters Patent is:

1. In a rotameter for the measurement of instantaneous rates of fluid flow, a substantially cylindrical vertical chamber provided with fluid inlet and fluid outlet means, a sectional bob enclosed by said chamber comprising an upper section and a separate lower section in surface to surface contact, the construction and arrangement of said upper bob section and said lower bob section being such that said upper bob section acts as a pivot for said lower bob section, and vertical guide means cooperating with said bob for limiting lateral movement of said bob during fluid measuring operations.

2. In a rotameter for the measurement of instantaneous rates of fluid flow, a substantially cylindrical vertical chamber provided with fluid inlet and fluid outlet means, a sectional bob enclosed by said chamber comprising a substantially cylindrical upper section and a separate lower section in surface to surface contact, the construction and arrangement of said upper bob section and said lower bob section being such that said upper bob section acts as a pivot for said lower bob section, and vertical guide means cooperating with said bob for limiting lateral movement of said bob during fluid measuring operations.

3. In a rotameter for the measurement of instantaneous rates of fluid flow, a substantially cylindrical vertical chamber provided with fluid inlet and fluid outlet means, a sectional bob enclosed by said chamber comprising a substantially cylindrical upper section and a separate lower section comprising an inverted frustum of a cone in surface to surface contact therewith, the construction and arrangement of said upper bob section and said lower bob section being such that said upper bob section acts as a pivot for said lower bob section, and vertical guide means cooperating with said bob for limiting lateral movement of said bob during fluid measuring operations.

4. In a rotameter for the measurement of instantaneous rates of fluid flow, a substantially cylindrical vertical chamber provided with fluid inlet and fluid outlet means, a sectional bob enclosed by said chamber comprising a substantially cylindrical annular upper section having the lower end thereof tapered and rounded, and a separate lower section in surface to surface contact therewith, the latter comprising an inverted frustum of a cone, the construction and arrangement of said lower bob section being such that it pivots on the rounded portion of said upper bob section, and a vertical guide rod passing through both the upper and lower sections of said sectional bob for limiting lateral movement of said bob during fluid measuring operations.

5. In a rotameter for the measurement of instantaneous rates of fluid flow, a substantially cylindrical vertical chamber provided with fluid inlet and fluid outlet means, a sectional bob enclosed by said chamber comprising a substantially cylindrical annular upper section having the lower end thereof tapered and rounded, a separate lower section comprising the inverted frustum of a cone having a concave depression in the upper surface thereof, the latter being in surface to surface contact with the rounded portion of the upper section, and a vertical guide rod passing through both the upper and lower sections of said sectional bob for limiting lateral movement of said bob during fluid measuring operations.

6. In a rotameter for the measurement of instantaneous rates of fluid flow, a substantially cylindrical vertical chamber provided with fluid inlet and fluid outlet means, a sectional bob enclosed by said chamber comprising a substantially cylindrical annular upper section having the lower end thereof tapered and rounded, a separate lower section comprising the inverted frustum of a cone provided with a central tapered hole of greatest diameter at its lower end, said lower section having a concave depression in the upper surface thereof in surface to surface contact with the rounded lower end of the upper section, and a vertical guide rod passing through both the upper and lower sections of said sectional bob for limiting lateral movement of said bob during fluid measuring operations.

ROBERT H. PRATT.
JAMES Q. UNDERWOOD, Jr.

REFERENCES CITED

The following references are of record in the file of this patent:

UNITED STATES PATENTS

| Number | Name | Date |
| --- | --- | --- |
| 1,980,761 | Mock et al. | Nov. 13, 1934 |
| 2,350,343 | Fischer | June 6, 1944 |

Certificate of Correction

Patent No. 2,458,637.    January 11, 1949.

ROBERT H. PRATT ET AL.

It is hereby certified that errors appear in the printed specification of the above numbered patent requiring correction as follows:

Column 1, line 22, for the words "latter end" read *latter tend*; line 53, same column, and column 2, line 43, for "self-cleaning" read *self-clearing*;

and that the said Letters Patent should be read with these corrections therein that the same may conform to the record of the case in the Patent Office.

Signed and sealed this 28th day of June, A. D. 1949.

[SEAL]

THOMAS F. MURPHY,
*Assistant Commissioner of Patents.*